Oct. 18, 1960 J. H. COOPER ET AL 2,957,071
STRIP WELDER
Filed May 2, 1958 5 Sheets-Sheet 1

FIG. 1

INVENTOR
JOSEPH H. COOPER
MELVIN M. SEELOFF
BY *Francis J. Klempay*
ATTORNEY

Oct. 18, 1960  J. H. COOPER ET AL  2,957,071
STRIP WELDER

Filed May 2, 1958  5 Sheets-Sheet 4

FIG. 5

INVENTOR
JOSEPH H. COOPER
MELVIN M. SEELOFF

BY *Francis J. Klempay*
ATTORNEY

United States Patent Office 2,957,071
Patented Oct. 18, 1960

2,957,071
STRIP WELDER

Joseph H. Cooper and Melvin M. Seeloff, Warren, Ohio, assignors to The Taylor-Winfield Corporation, Warren, Ohio, a corporation of Ohio Filed May 2, 1958, Ser. No. 732,596

22 Claims. (Cl. 219—82)

The present invention relates generally to welding apparatus and more particularly to apparatus adapted to weld the adjacent ends of metal strips or sheets in end-to-end relation thereby forming a continuous length of metal strip. A machine of this type is known in the art as a strip welder and may be advantageously employed in an automated continuous process line where a continuous length of metal strip is formed, coated or otherwise worked as is desired. Metal strip is usually furnished to the process line in coils or sheets and it is the function of the strip welder to join the coils or sheets in end-to-end relation to provide the continuous length of strip. Due to advances in other arts continuous automated process lines are capable of very high speed operations and any strip welder adapted for use therewith must also be capable of relatively high speed welding operations if the process line is to be operated in an efficient manner. Many of these strip process lines are designed for working on a continuous length of metal strip which is relatively thin and has a metallurgical composition, such as a high degree of carbon, for example, which does not lend itself readily to shearing and welding operations. The combination of a thin metal strip with an unfavorable, from a welding standpoint, metallurgical characteristic can result in a particularly difficult strip welding or joining problem as is apparent to those skilled in the art. Another requirement often specified for a strip welder is that it be capable of completing a welded seam between the adjacent ends of metal coils or sheets which is of such a thickness so as to be able to pass through the continuous process line without adversely affecting the same. As an example, in many process lines spring-biased strip rollers are used and if the welded seam has too large a thickness dimension the rollers will be deflected appreciably and, due to the high speed of the strip and the mechanical response of the rollers, large areas of metal strip adjacent the welded seam may be rendered completely unacceptable.

In view of the above, it is the primary or ultimate object of the present invention to provide an improved strip welder for welding the adjacent ends of metal coils or sheets to form a continuous length of metal strip which is characterized by its ability to weld the strips in a minimum of time, to effect completely acceptable welds on thin strips with unfavorable metallurgical characteristics and to provide a welded seam between the strip ends which is of acceptable thickness dimension. Of course, strip welders have been proposed in the prior art, such as the one shown in the F. C. Biggert, Jr., et al. Patent No. 2,078,365, but the prior art apparatus is not adapted to complete welds between the ends of adjacent strips which are acceptable under the requirements set forth above.

A further object of the invention is to provide a strip welder for the joining of metal strips or sheets which is operative to very accurately and precisely control the clamping, shearing and positioning of the strip ends prior to welding. As is well known by those skilled in the art, successful welding operations, especially on thin strip of unfavorable metallurgical composition, are predicated upon the proper clamping, shearing and positioning of the strip ends prior to welding.

It is a further object of the invention to provide a strip welder adapted to complete a weld which is angularly disposed across the continuous length of metal strip. In this manner the welded seam does not pass through the processing equipment along a line transversely disposed to the path of strip travel but in a line angled with respect thereto so that damage, bouncing, etc. of the processing equipment is mitigated.

Another object of the present invention is to provide a strip welder including a plurality of improved features which allow the fast and efficient operation thereof. As will be hereinafter more fully apparent, the strip welder comprises a transversely movable carriage which mounts an electric resistance seam welder and shearing apparatus in side-by-side relation so that upon transverse movement of the carriage either the shearing apparatus or the electric resistance seam welder are moved into operative relation with respect to the strip ends. In addition, improved guiding means and actuating means for the shearing apparatus are employed and the clamping assemblies for clamping and moving the strip ends are characterized by its accuracy and adjustability.

These objects, as well as other objects and advantages of the invention, will become more readily apparent upon consideration of the following specification and accompanying drawings wherein there is described and shown a preferred illustrated embodiment of the invention.

Figure 1:
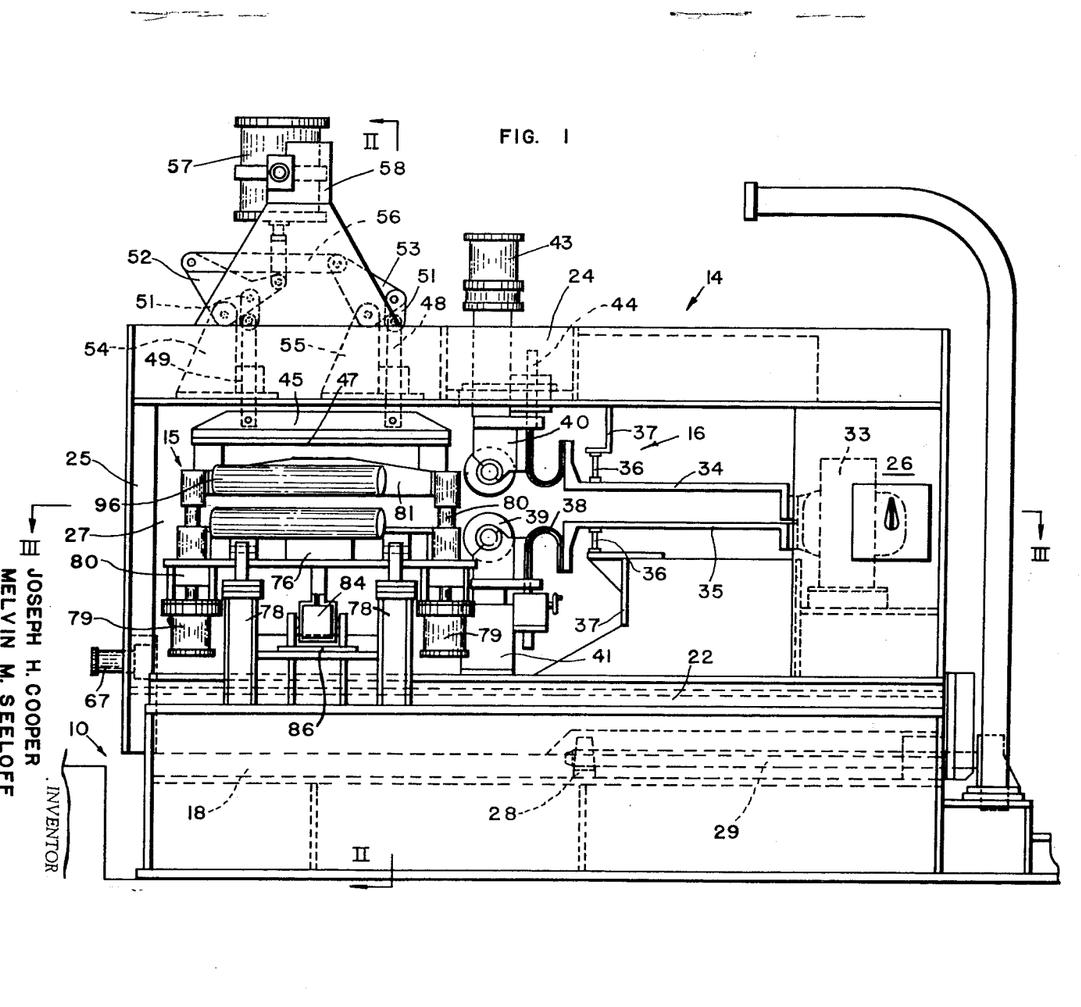
Figure 1 is a horizontal side view depicting a strip welder constructed in accordance with the teachings of the present invention.
Figures 2, 3, 6:
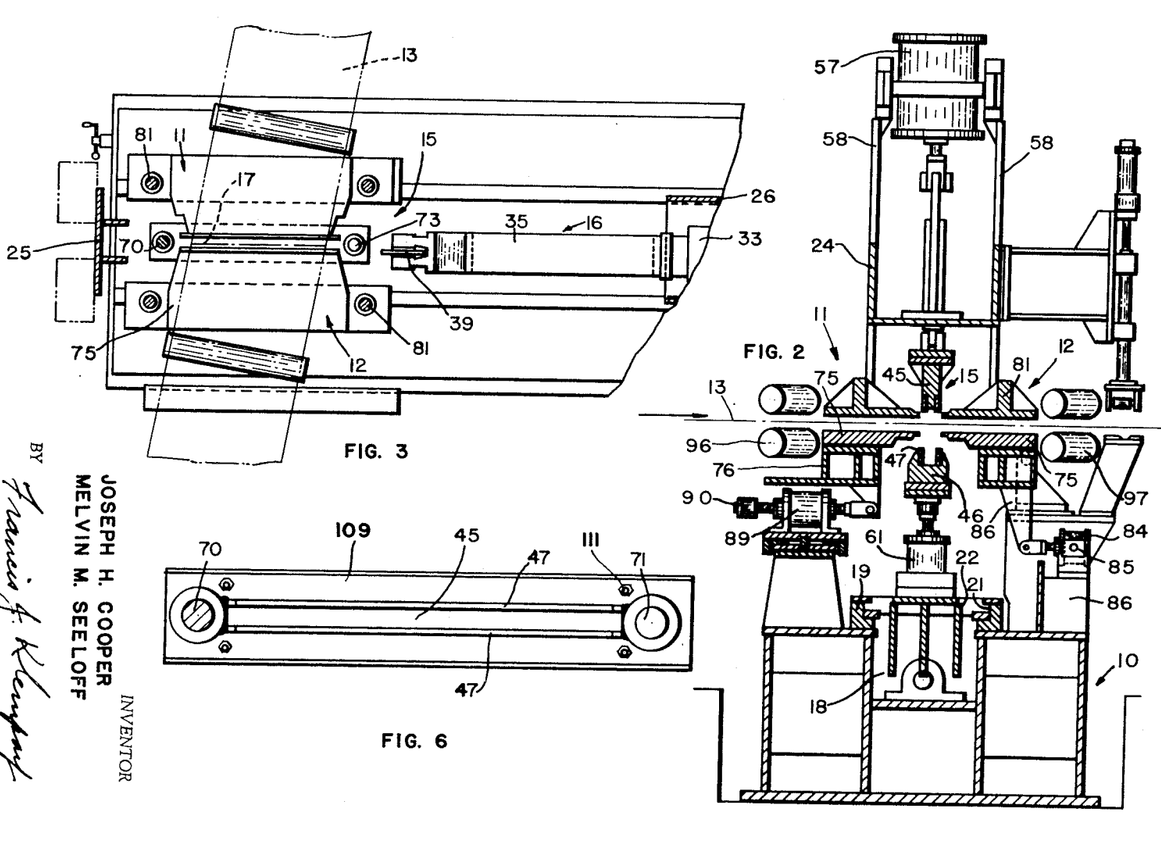
Figure 2 is an end sectional view of the strip welder taken along the section line II—II of Figure 1.
Figure 3 is a sectional plan view of the apparatus of Figure 1 taken along section line III—III showing particularly the position of the strip welder with respect to the path of strip travel.
Figure 6 is an underside plan sectional view taken along the section line VI—VI of Figure 4.

Referring now to the drawing, and initially to Figures 1-3 thereof, there is shown a strip welder constructed in accordance with the teachings of the present invention. The strip welder comprises a main housing designated in the various views of the drawing by the reference numeral 10 which supports a pair of clamping assemblies, 11 and 12, respectively, on opposite sides of a normal path of travel 13 for the metal strips to be joined. The normal direction of a strip travel along the path 13 is indicated by an arrow in the drawing. The housing 10 also slidably mounts a carriage 14 which in turn supports shearing apparatus 15 and welding means 16 in side-by-side relation for generally transverse movement with respect to the path of strip travel. The structure and specific functioning of the various means, assemblies, housings, etc. will be further explained in the following specification. However, it should be noted at the outset that the housing 10 and carriage 14, as well as the appurtenant equipment carried and supported thereby, are disposed at an angle with respect to the plane of the normal path of strip travel 13 so that a welded seam 17 completed by the strip welder extends in angled relation across the continuous length of strip. In this manner the welded seam is better adapted for passing through the various pieces of equipment, not shown, in an automated continuous process line but yet the angle is such that the length of the seam is not appreciably longer than a seam extending in perpendicular relation with respect to the edges of the continuous strip so that the length of the shearing apparatus, clamping assemblies, etc., need not be much wider than the width dimension of the continuous length of strip.

The housing 10 is securely anchored to the floor of a plant and is formed from suitable structural members to define a generally transversely extending upwardly opening recess 18. The upper edges of the recess 18 mount a pair of inwardly directed angle members 19 which, in cooperation with wear-resistant blocks 20, form a pair of spaced transversely extending ways 21. Received within the ways 20 are the laterally projecting slides extending from a bottom portion 22 of the movable carriage 14. The bottom portion 22 of the carriage is nestingly received within the recess 18 and the configuration of the housing 10 is such that the carriage may be slidably moved from left to right as viewed in Figure 1 of the drawing.

The movable carriage 14 is rectangularly shaped and comprises a top portion 24 and a pair of spaced front and rear wall portions 25 and 26, respectively, which, in addition to the previously mentioned bottom portion 22, define and bound a large rectangular opening 27. Each of the top, bottom and side wall portions is of beam-like construction—being assembled from a plurality of properly formed structural members—so that the carriage is characterized by its extreme rigidity, ruggedness and stability. This feature is particularly important and will be fully appreciated when it is remembered that the welding means 16 and shearing apparatus 15 are supported and carried thereby and that the completion of an acceptable welding operation is directly dependent upon accurate transverse movement of the carriage with respect to the metal strip ends. However, any movement of the carriage in the direction of strip travel or skewing of the carriage cannot be tolerated if the ends of strips are to be properly formed.

The bottom portion 22 of the rectangularly shaped carriage 14 rigidly carries a threaded nut 28 that has engagement with a forwardly extending journaled threaded shaft 29. The threaded shaft 29 is connected through a clutch or transmission with a drive motor, not shown, which is preferably of the variable speed type in order that the speed of the shaft can be controlled and adjusted. The arrangement is such that upon proper actuation of the drive motor the threaded shaft 29 is driven and drives the carriage 14 through its traverse because of the engagement between the nut and the threaded shaft. Of course, the carriage can be retracted into its original position upon reverse actuation of the driver motor or proper manipulation of the transmission.

As previously indicated, the welding means 16 is mounted to the right hand side within the rectangular opening 27 of the carriage and this welding means comprises a low voltage-high amperage welding transformer 33 mounted on a suitable platform within the rear wall portion 26. The spaced secondary terminals of the welding transformer 33 have bolted thereto forwardly extending upper and lower electrode arms 34 and 35, respectively, which are disposed in generally spaced parallel relation for the reception of the strip ends therebetween when the same are being welded upon transverse movement of the carriage. Both of these electrode arms are supported near their forward ends by adjustable supporting rods 36 which extend from large brackets 37 that are attached to the bottom and top portions of the carriage. Connected to the forward end of each of the electrode arms 34 and 35 is a looped bundle of flexible conductors 38 that electrically connect the electrode arms to electrode assemblies while yet allowing limited movement between the electrode assemblies and the current conductive arms.

Each of the electrode assemblies comprises an electrode wheel 39 and a journal bracket 40 therefor so that the electrode wheels are journaled for rolling movement. The lower journal bracket 40 is securely, but adjustably, mounted on pedestal 41 extending upwardly from the bottom portion 22 of the carriage 14 with the periphery of the lower electrode wheel being tangentially disposed with respect to the normal path of strip travel. The upper journal bracket 40 is operatively connected with the piston rod of fluid electrode actuating cylinder 43 which is mounted directly on the top portion 24 of the carriage 14. The upper electrode assembly carries a pin 44 guided in a suitable aperture in the top portion of the carriage to guide and properly index the upper electrode assembly. Upon proper movement of the carriage the electrode actuating cylinder 43 may be energized to lower the upper electrode wheel into pressure contact with the strip ends and the lower electrode wheel. Electrical current may then be supplied from the transformer through an electrical circuit including the electrode arms, flexible conductors and journal brackets to the electrode wheels and strip ends for heating the same. As the electrode wheels roll across the strip ends they are heated and fused to form the continuous length of strip.

Figures 7, 8, 9:
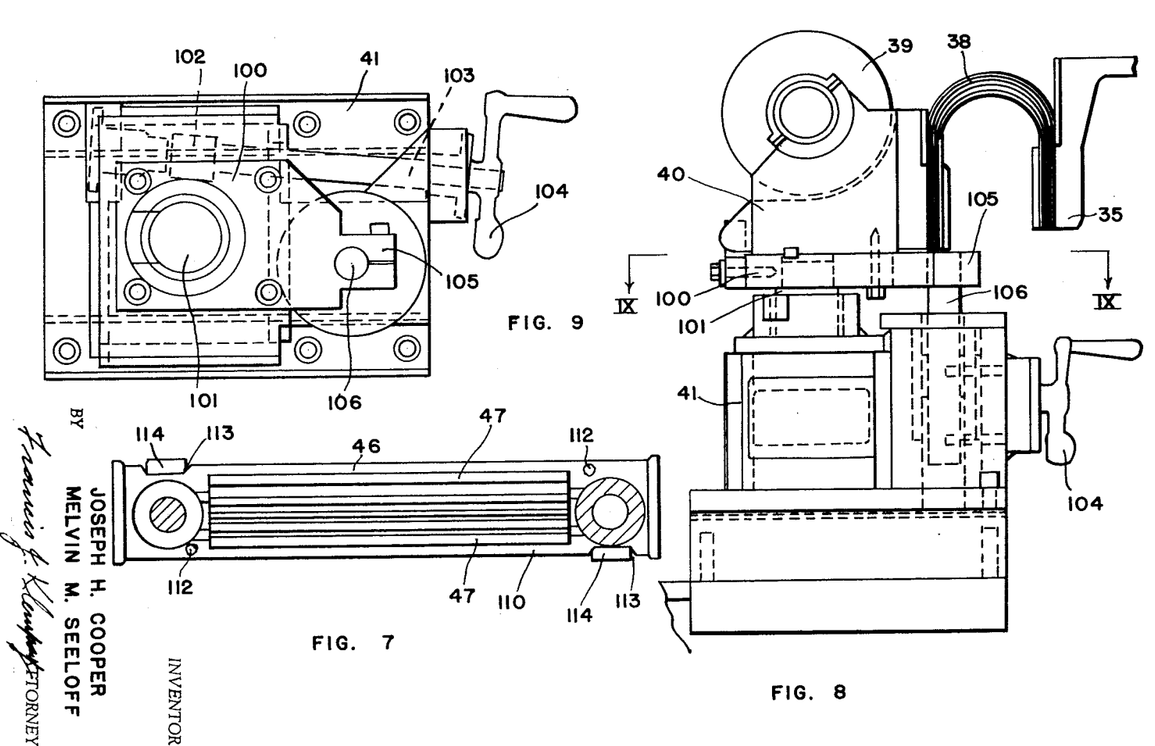
Figure 7 is a plan sectional view taken along the section line VII—VII of Figure 4.
Figure 8 is an enlarged side elevational view of the mechanism employed for adjusting and aligning the vertical position of the lower electrode wheel.
Figure 9 is a plan view taken along the section line IX—IX of Figure 8.

As previously indicated the lower journal bracket 40 is securely, but adjustably, mounted on the pedestal 41 and the mechanism for adjusting the vertical position of the lower electrode wheel is shown in Figures 8 and 9 of the drawing. The electrode wheels 39 are made from copper or other like soft current conducting material and are subject to wear thereby decreasing in diameter upon continuous usage. In order to complete acceptable welds the lower electrode wheel 39 should always be disposed tangentially with respect to the plane of the bottoms of the strip ends clamped in the clamping assemblies 11 and 12 and means must therefore be incorporated to allow for precise vertical adjustment of the lower electrode wheel.

The lower journal bracket 40 is bolted to a plate 100 and this plate in turn is mounted on the upper end of a lifting rod 101 which is guided for vertical movement within the pedestal 41 by suitable bushings, not particularly shown. The lifting rod 101 is threaded intermediate its ends and threadably received in encircling relation with this threaded portion is an internally threaded annular gear, not shown. The gear teeth around the outer periphery of the annular gear are adapted to mesh with a worm gear 102 which is mounted on a shaft 103 journaled within and extending the length of the pedestal 41. The outer protruding end portion of the shaft 103 mounts a suitable handle 104 and it should thus be apparent that when the handle is turned the shaft 103, worm gear 102 and the annular gear will also rotate thereby raising or lowering the plate 100 and the lower electrode wheel mounted therefrom. The plate 100 has a rearwardly extending clevis 105 which receives a pin 106 extending upwardly from the pedestal to provide a means for locking the lower electrode wheel in any adjusted position. The entire adjusting mechanism allows for accurate and precise vertical adjustment of the lower electrode wheel thereby greatly facilitating the completion of acceptable welds.

Mounted to the left of the welding means and within the rectangular opening 27 of the carriage is the shearing apparatus 15. The shearing apparatus comprises opposed upper and lower shear carriers 45 and 46, respectively, which mount spaced pairs of cooperating shear blades 47 whereby upon proper movement of the shear carrier the opposed shear blades cooperate to shear or crop the ends of the strips to be joined.

The upper shear carrier 45 mounts a transversely spaced pair of the shear blades 47 and is pivotally connected to the lower ends of the two longitudinally spaced operating rods 48 which extend through vertically extending guide bushings 49 carried by the top portion of the carriage. The operating rods 48 have their extreme upper ends pivoted to links 51 that are in turn pivotally connected to bellcranks 52 and 53. The bellcranks 52 and 53 are pivotally supported from stationary brackets 54 and 55 projecting upwardly from the top portion of the carriage 14 and have one set of their arms interconnected by a tie bar 56. A fluid shear actuating cylinder 57 is mounted between clevis-like supports 58 extending in spaced relation upwardly from the top portion of the carriage. The piston rod of this shear actuating cylinder is drivingly connected with the bellcrank 52 and the arrangement is such that upon proper actuation of the shear actuating cylinder the upper shear carrier 45 will be moved through a shearing stroke.

Figure 4:
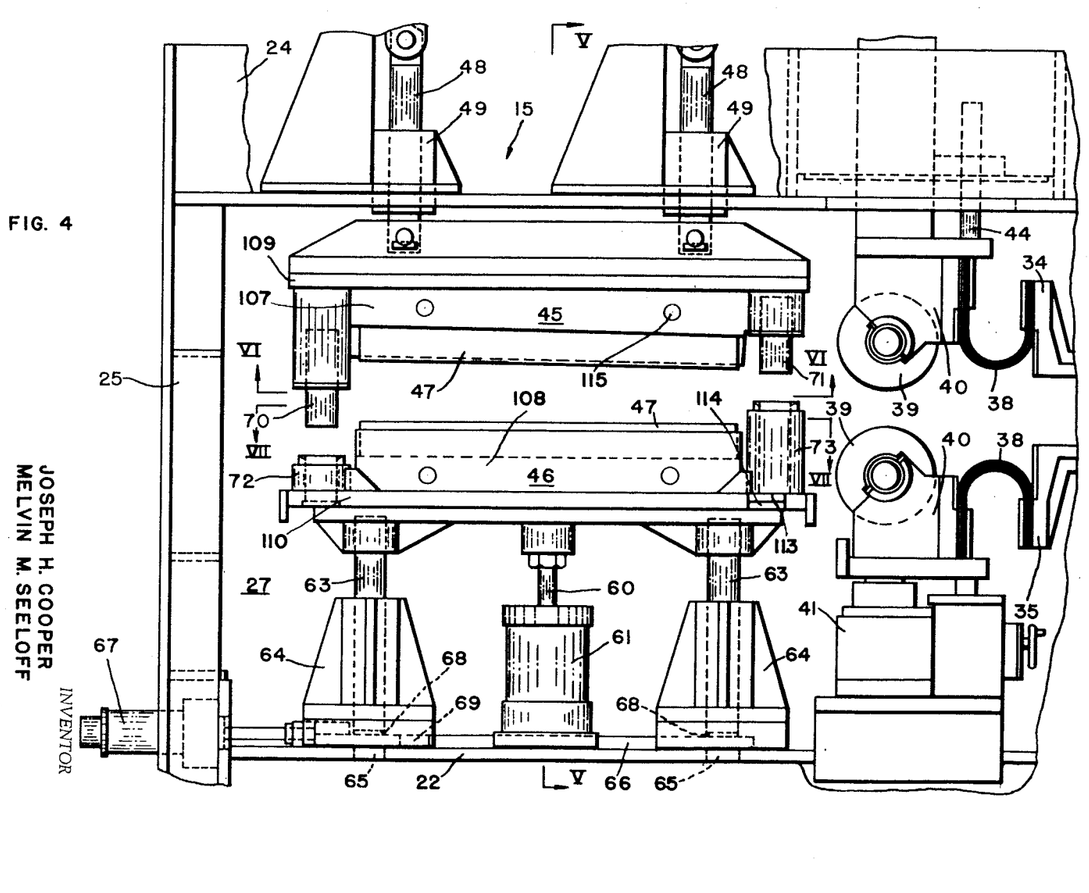
Figure 4 is an enlarged fragmentary horizontal side view showing specifically the shearing apparatus employed in the shear welder shown in Figure 1.
Figure 5:
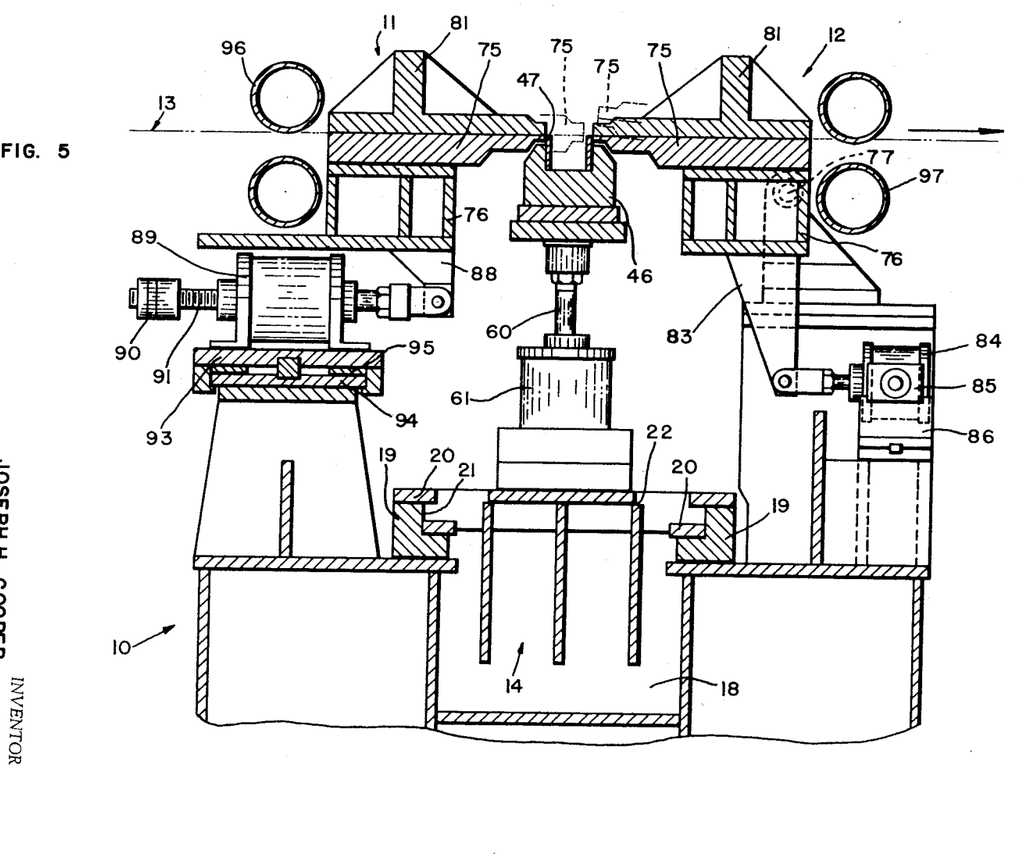
Figure 5 is a fragmentary end sectional view taken along the section line V—V of Figure 4.

The mounting of the lower shear carrier 46 carrying the lower shear blades is perhaps best shown in Figures 2, 4 and 5 of the drawing. The shear carrier 46 is connected intermediate its ends to a piston rod 60 of a fluid lifting cylinder 61 which is mounted on the bottom portion 22 of the carriage 14 in the position and manner depicted. The function of the fluid lifting cylinder is to raise and lower the lower shear carrier 46 and the shear blades 47 mounted thereon into and out of their shearing position directly below the path of strip travel. The alternate lowered and raised positions of the shear blades and lower shear carrier are shown in Figures 2 and 5, respectively.

The lower shear carrier 46 carries on both sides of the fluid lifting cylinder 61 adjacent its ends the large diametered guide rods 63 which project downwardly therefrom and have their lower ends guided for vertical movement in the upstanding guide holders 64. The guide holders 64 are mounted on the bottom portion of the carriage and are apertured throughout their length so that the guide rods 63 may freely pass therethrough at certain times. The guide holders 64 are mounted with their apertures aligned with apertures 65 in the bottom portion of the carriage and in spaced relation with respect to the upper supporting surface of the bottom portion of the carriage so that a large rectangular blocking plate 66 may be received and moved thereunder. The rectangular blocking plate 66 is movable by a fluid locking cylinder 67 and has a pair of spacer blocks 68 mounted thereon which, upon proper actuation of the locking cylinder and movement of the blocking plate, are interposed beneath the guide rods 63 to support and prevent the retraction of the lower shear carrier. By effectively blocking the apertures 65 in the bottom portion of the carriage retraction of the lower shear carrier is prohibited and any and all shock forces experienced during shearing operations are taken through the large diametered guide rods. This not only relieves the lifting cylinder from shock forces whereby the same need only be of sufficient capacity to raise and lower the lower shear carrier but also provides inherently rigid and stable lower shearing apparatus for the strip welder. The rectangular blocking plate 66 has an aperture 69 therein which upon movement of the plate to its other position is aligned with the aperture 65 and the guide holder on the left hand side of the apparatus (see Figure 4) while the right hand end of the plate clears the other aperture 65. Thus, upon retractive sliding movement of the blocking plate 66 the lower shear carrier and the shear blades carried thereby may be retracted. This general arrangement is shown and claimed in the co-pending patent application Serial No. 616,151 of Joseph H. Cooper entitled "Narrow Lap Seam Welder" and which is assigned to the assignee of the present invention.

In operation of the shearing apparatus the lower shear carrier is moved into position directly below the path of strip travel and the upper shear carrier is moved through a shearing cycle so that the upper and lower shear blades cooperate to shear or crop the strip ends. As previously indicated, acceptable welding operations are predicated upon accurate and precise shearing of the strip ends and to insure such shearing there is provided guiding means for the shear carriers. As will be clearly observed in Figure 4 the upper shear carrier 45 mounts a pair of downwardly extending front and rear guide pins 70 and 71 mounted outwardly on opposite sides of the path of strip travel. The guide pins 70 and 71 are adapted to be received in the guiding sockets 72 and 73, respectively, mounted on the ends of the lower shear carrier 46 and having splayed top edge portions for properly guiding and receiving the guide pins during a shearing cycle. It will be noted that the guide pin 70 and receiving socket 72 are offset in the vertical direction with respect to the normal path of strip travel and the guide pin 71 and receiving socket 73. This arrangement is particularly advantageous since the guide pins and sockets are aligned with the transverse center line of the strip welder carriage and the mounting of socket 72 below the path of strip travel allows for the removal of the sheared croppings from the strip welder which would otherwise be unremovable.

It will be noted from Figure 4 of the drawing that the shear blades 47 of the upper and lower shear carriers 45 and 46 are secured to shear mounting blocks 107 and 108, respectively, which are attached to shear mounting plates 109 and 110. The plates 109 and 110 also carry the guide pins 70 and 71 and the guiding sockets 72 and 73 at the ends thereof in the manner clearly depicted. As shown in Figure 6 the upper plate 109 is attached to a suitable member carried by the operating rods 48 by means of four upwardly extending bolts 111. The lower plate 110 is attached to a like suitable member carried by the piston rod 60 and guide rods 63 by a pair of bolts 112 disposed at two opposite corners of the assembly as shown in Figure 7. The other opposite corners of the plate 110 are notched at 113 to receive a pair of locating blocks 114. This manner of construction and assembly of the upper and lower shear carriers is partangular openings 27. The upper shear carrier 45 is placement of the same as will be explained below.

To effect a removal of the shear carriers the operator first runs the carriage 24 all the way to the left so that the shearing means is positioned outwardly of the clamping assemblies and exposed from both sides of the rectangular opening 27. The upper shear carrier 45 is lowered until it rests upon the lower shear carrier and it will be noted that at this time the guide pins 70 and 71 are received within their sockets 72 and 73. The operator then removes the bolts 111 to loosen the upper shear mounting plate 109 from its support and the operating rods are vertically withdrawn to their retracted positions. Then the bolts 112 are removed to loosen the lower shear mounting plate 110 from its support. The combined assembly of the upper and lower shear blades, shear mounting blocks, shear mounting plates, guide pins and guiding sockets can be raised upwardly and then removed laterally through either side of the rectangular opening. The arrangement is such that the guide pins and guiding sockets cooperate in forming a die set shearing assembly which may be easily removed and replaced. A plurality of recesses or lifting holes 115 are provided in the outer faces of the shear mounting blocks 107 and 108 to facilitate the handling of these members. During removal operations the shearing assembly is to the left of the clamping assemblies and completely exposed while only six bolts need be removed to free the shearing assembly and the entire assembly may be removed as a single unit because of the die set arrangement.

To replace the shearing assembly within the strip welder it is only necessary to position the carriage to the left and then place the shearing assembly on the lower support. The shearing assembly will be properly and correctly positioned with respect to the rest of the apparatus by the locating blocks 114 and notches 113 as is readily apparent. Upon replacing the six bolts the shearing assembly is again ready for operation. Both the removal and replacement operations are characterized by their extreme simplicity and the swiftness with which such operations may be completed. This is particularly important in continuous process lines wherein the repair of one machine may effect the operation of the entire line.

As previously mentioned, the housing 10 supports a pair of clamping assemblies 11 and 12 on the opposite sides of the carriage 24 in line with the path of strip travel. These clamping assemblies, as will be explained below, have the function of clamping and securely holding the strip ends during shearing operations and then to properly move and position the same prior to welding operations.

The clamping assembly 12 comprises a lower clamping member 75 which has a very large clamping surface and extends across the path of strip travel as shown in Figure 3. The lower clamping member 75 is rigidly mounted on a transversely extending platen 76 which is mounted for pivotal movement by a pair of spaced pivot pins 77 that in turn are journaled in upwardly extending support assemblies 78 (see Figure 1) mounted on the housing 10. The platen 76 is of considerably longer length than the lower clamping member 75 and mounts adjacent the ends thereof in downwardly depending relation a pair of fluid clamping cylinders 79 whose piston rods are connected with vertically operating linkage 80 mounting and carrying an upper clamping member 81. Upon proper actuation of the clamping cylinders 79 the upper clamping member 81 will be lowered into clamping relation with the lower clamping member 75 for firmly clamping a strip adjacent its end therebetween. The clamping assembly forcibly engages a very large area of the strip closely adjacent the line of shear and this precludes any movement or buckling of the clamped strip end in any direction during shearing, welding, etc. The large clamping area also allows effective clamping of strip whose thickness dimension may vary across the face thereof as is apparent. Intermediate the ends of the platen 76 and rigidly attached thereto is a depending triangularly shaped bracket 83 whose lower end is attached to the piston rod of a fluid pivot cylinder 84. The pivot cylinder 84 is pivotally mounted between a clevis 85 extending from a pedestal-like support 86 attached to the housing 10. The arrangement is such that upon actuation of the pivot cylinder the platen 76 and everything attached thereto, including the upper and lower clamping members, the clamping cylinders and linkage and a clamped strip end, will be pivoted upwardly into the position represented by the dotted lines in Figure 5 of the drawing. The utility of this arrangement will be explained later in the specification.

The clamping assembly 11 is of somewhat similar construction to the clamping assembly 12 and like parts of this assembly are indicated by the same reference numerals to preclude unnecessary repetition in the specification. However, it will be noted that the mounting of the platen 76 is considerably different and this will now be explained. The platen has a downwardly extending bracket 88 intermediate the ends thereof which is attached to piston rod 91 of a slide cylinder 89. The platen, of course, is supported adjacent its ends by suitable supports, not specifically shown, and is adapted for sliding movement on these supports in the direction of strip travel. With the platen so supported actuation of the fluid slide cylinder will cause longitudinal movement of the platen and clamping apparatus carried thereby as well as a clamped strip end forwardly into the position shown by the broken lines. It is noted that the innermost position of the platen and consequently the clamped strip end can be accurately adjustably limited by proper adjustment of limiting nut 90 on the rear end of the piston rod 91 of slide cylinder 89.

The slide cylinder 89 is rigidly mounted on a transversely extending plate 93 and this plate is adapted for transverse sliding movement with respect to a stationary plate 94 mounted from the housing 10 by a plurality of wear-resistant slides 95. Suitable actuating means, not particularly shown, are included for sliding the plate 93 and clamping apparatus carried thereby with respect to the housing 10 for transversely aligning the ends of the strips prior to shearing and/or welding operations.

The strip welder of the present invention also may comprise other apparatus, such as the pairs of strip handling pinch rolls 96 and 97 positioned on opposite sides of the strip welder in exact transverse alignment with the path of strip travel for moving the strip ends during a joining operation. Also, apparatus for transversely guiding the strip ends, not shown, may be included if desired.

*Operation*

Considering now the operation of the strip welder of the present invention it is assumed that all components of the strip welder are initially in their retracted positions as shown in Figure 2 of the drawing with the carriage 14 to the right. As one coil or sheet of strip material is exhausted its trailing end moves into the welding apparatus where it is clamped by the clamping assembly 12 upon actuation of the clamping cylinders 79 associated therewith. The leading end of a new coil or sheet is then moved into the strip welder and is firmly clamped by the clamping assembly 11 as previously explained. Thus, both the trailing and leading strip ends are firmly clamped and any undesirable movement of these strip ends in any direction is precluded.

While the strip ends are being clamped the lifting cylinder 61 is actuated to move the lower shear carrier 46 into position directly below the path of strip travel. The locking cylinder 67 is then actuated to shift the blocking plate 66 to block retractive movement of the carrier and relieve the lifting cylinder of shock forces.

After the strip ends are clamped the platen 76 and the clamping members, as well as the leading strip end, are shifted as required to transversely align the trailing and leading ends of the strips. Then fluid is supplied to the shear actuating cylinder 57 to cause the upper shear carrier 45 to move through a shearing cycle. The cooperating upper and lower shear blades 47 crop the projecting edge portions of the leading and trailing strip ends during this shearing cycle. It will be noted that the strip ends are firmly clamped throughout the shearing cycle and that the upper shear carrier is accurately guided by the guiding means comprising the guide pins 70 and 71 and sockets 72 and 73 to effect accurate shearing of the strip ends. After the shearing cycle the upper carrier 45 is again in its retracted position and the operator removes the croppings endwise through the space provided by offset guide pin 70 and socket 72. Also, the lower shear carrier is lowered into its original retracted position.

With the strip ends thus sheared it is necessary to properly position them prior to welding. This is accomplished by first actuating pivot cylinder 84 to pivotally raise the trailing strip end vertically above the normal plane of strip travel. Then the slide cylinder 89 is caused to move the leading strip end longitudinally until the movement thereof is accurately and precisely limited by the adjustable limiting nut 90. The raising of one of the clamping assemblies and the strip clamped thereby prevents jamming of the strip ends upon relative movement thereof and allows the same to be accurately and precisely overlapped. The amount of overlap required is dependent upon the thickness and composition of the strips being welded and is controlled by the adjustable limit nut. After overlap the clamping assembly 12 may be lowered to effect tight frictional contact between the overlapped strips. It will be noted that the overlapped strips are offset to one side of the center line of the shearing apparatus because only one of the clamp assemblies moves longitudinally in the direction of strip travel. When the strips have been overlapped the drive motor is energized to start movement of the rectangular carriage 14 to the left as seen in Figure 1 of the drawing. It will be remembered that the clamping assemblies are mounted on the housing 10 and therefore the carriage moves with respect to the overlapped strip ends. As the carriage continues to move to the left the shearing apparatus moves from over the strip ends and the welding means moves thereacross.

Fluid is supplied to the electrode actuating cylinder 43 to move the upper electrode wheel 39 into pressure engagement with the overlapped workpieces and the lower electrode wheel. As the electrode wheels roll onto and across the strip ends upon continued movement of the carriage the welding transformer is energized to supply current to the overlapped strip ends causing the same to soften. The pressure exerted through the electrode wheels causes the strip ends to fuse and the pressure is of sufficient magnitude so that the resultant welded seam is of less thickness than the additive sum of the thicknesses of the strip ends. This type of welding is known as narrow lap or semi-mash method of seam welding and is familiar to those skilled in the art.

When the electrode wheels reach the opposite side of the strip ends and the same are completely welded the electrode wheels are separated and the clamping assemblies retracted to free the welded continuous length of strip for further movement. The carriage is returned to its original position and the strip welder is again prepared for another strip welding operation.

It should be apparent that the objects initially set forth have been accomplished. The strip welder disclosed is ideally suited for carrying out strip welding operations in a fast and efficient manner on all types and sizes of strip material but yet provides a welded seam capable of passing through other processing equipment. As will be understood, semi-mash or narrow lap methods of seam welding require the utmost accuracy and control over the clamping, shearing and overlapping of the strip ends and the strip welder of the present invention provides the requisite control and accuracy thereby allowing completion of entirely acceptable welds. The use of guide means for the shears, the limit nut for the movable clamping assembly, the rigid rectangular carriage, etc. all contribute to the utility of the strip welder.

Of course, many changes may be made in the illustrated embodiment of the invention without departing from the clear teachings thereof. For example, automatic sequencing controls may be used to control the actuation of the strip welder disclosed if desired. Accordingly, reference should be had to the following appended claims in determining the true scope of the invention.

We claim:

1. A strip welder adapted for joining metal strip ends to form a continuous length of strip comprising a stationary housing, said housing having an upwardly opening recess therein, a carriage received in said recess and guided thereby for transverse movement in a direction generally transverse to the normal path of strip travel, said carriage mounting shearing apparatus and welding means in side-by-side relation and being transversely aligned with respect to said normal path of strip travel said shearing means being operative to shear said strip ends when the same is disposed within said normal path of strip travel, and said welding means joining said strip ends upon and during transverse movement of said carriage through said housing and across said normal path of strip travel.

2. A strip welder adapted to join metal strip ends to form a continuous length of metal strip comprising a housing disposed in the normal path of strip travel, said housing having a generally transversely extending upwardly opening recess therein, a pair of strip clamping assemblies stationarily mounted on opposite sides of said upwardly opening recess, a large transversely extending carriage in said normal path of strip travel, said carriage having front and rear portions thereby defining a rigid rectangular carriage with a large rectangular opening, shearing apparatus and welding means mounted within said large rectangular opening in side-by-side relation and being transversely aligned with respect to said normal path of strip travel, and said bottom portion of said carriage being received in said upwardly opening recess for guiding said carriage in its generally transverse traverse with respect to said path of strip travel.

3. Apparatus according to claim 2 further characterized in that said welding means comprises a pair of opposed welding electrode wheels, means to supply current to said wheels, means to move said electrode wheels relatively toward each other into pressure engagement with said strip ends to weld the same upon movement of said carriage comprising a fluid actuating cylinder, and said cylinder being mounted on one of said portions of said carriage.

4. A strip welder adapted for joining metal strip ends to form a continuous length of metal strip comprising a pair of spaced clamping assemblies mounted in the normal path of strip travel, a transversely movable carriage received between said clamping assemblies and movable in a direction generally transverse to said path of strip travel, said carriage having a generally rectangular opening and mounting therein shearing apparatus and welding means in side-by-side relation and being transversely aligned with respect to said normal path of strip travel said shearing means being operative to shear said strip ends when the same is disposed within said normal path of strip travel, and said welding means joining said strip ends upon and during transverse movement of said carriage through its traverse.

5. Apparatus according to claim 4 further characterized in that one of said clamping assemblies comprises means for raising a strip end clamped thereby vertically to one side of said normal path of strip travel, and means to move one of said clamps and a strip end clamped thereby longitudinally in said path of strip travel, and the arrangement being such that said strip ends are caused to overlap.

6. Apparatus according to claim 5 further characterized by means to adjustably limit longitudinal movement of said one of said clamps, said means to move comprising a fluid slide cylinder, and said means to adjustably limit comprising a stop nut threaded on the piston rod of said cylinder whereby accurate and precise control of the amount of overlap of the strip ends is afforded.

7. A strip welder for joining ends of metal workpieces which comprises a large rectangular housing, said housing having a large rectangular opening therein and defining beam-like vertically spaced top and bottom walls and beam-like longitudinally spaced front and rear walls, welding means and shearing means mounted within said large rectangular opening of said housing in side-by-side aligned relation, means to guide said housing for movement, and means to move said large rectangular housing.

8. A strip welder for joining the ends of metal workpieces which comprises a housing, means to guide said housing, means to move said housing, welding means for welding said metal workpieces mounted within said housing, said welding means comprising a pair of welding electrode wheels mounted on opposite sides of the normal path of travel of said workpieces, means mounting one of said welding electrode wheels for vertical movement, and means for vertically adjusting the other of said welding electrode wheels whereby said other of said welding electrode wheels may be adjusted upon decreases in diameter thereof to remain in fixed relation with respect to said path of travel.

9. Apparatus according to claim 8 further characterized in that said means for vertically adjusting comprises a pedestal, a vertically movable lifting rod received in said pedestal, said other of said welding electrode wheels being mounted from said lifting rod, said lifting rod having a threaded portion, an internally threaded ring gear received on said threaded portion, and means to rotate said internally threaded annular ring gear.

10. A strip welder adapted for joining metal strip ends to form a continuous length of metal strip comprising a pair of spaced clamping assemblies mounted in the normal path of strip travel, a transversely movable carriage received between said clamping assemblies and movable in a direction substantially transverse to said path of strip travel, said carriage having a generally rectangular opening and mounting therein shearing apparatus and welding means in side-by-side relation, said welding means comprising a pair of opposed welding electrode wheels, means journaling said wheels, means mounting one of said wheels for vertical movement, means for vertically adjusting the other of said wheels whereby said other of said wheels may be adjusted to remain in fixed relation with respect to said path of strip travel upon decreases in the diameter thereof, said means for vertically adjusting comprising a pedestal, a vertically movable lifting rod received in said pedestal and mounting said means journaling associated with said other of said electrode wheels, said rod having a threaded portion, an internally threaded annular gear received on said threaded portion, a second gear meshing with said threaded annular gear, and means to rotate said second gear.

11. In a welder for joining the ends of workpieces comprising a large housing having an opening therein, shearing means and welding means mounted in said opening in side-by-side relation, said shearing means and said welding means being operative to shear and join the adjacent ends of workpieces, respectively, said shearing means comprising a pair of shear carriers disposed on opposite sides of the normal path of workpiece travel, said shear carriers mounting opposed shear blades, means to effect relative movement of said shear carriers to shear said workpieces; the improvement comprising means to guide said shear carriers during relative movement thereof independently of said housing, said means to guide comprising a guide pin mounted from one of said shear carriers, and a guide socket mounted from the other of said shear carriers adapted to receive said guide pin upon relative movement of said shear carriers.

12. Apparatus according to claim 11 further characterized in that each of said shear carriers is attached to a supporting surface, and at least one of said supporting surfaces and said shear carrier associated therewith having cooperating locating means thereon for properly positioning said last mentioned shear carrier with respect to said associated supporting surface.

13. Apparatus according to claim 11 further characterized in that said means to guide comprises a pair of said guide pins and a pair of said guide sockets, and cooperating ones of said guide pins and said guide sockets being mounted on opposite sides of said shear blades out of said normal path of workpiece travel when said shear blades are disposed therein.

14. Apparatus according to claim 13 further characterized in that said cooperating ones of said guide pins and said guide sockets on opposite sides of said shear blades are offset with respect to the plane of shear of said shear blades and with respect to each other.

15. In a welder for joining workpieces comprising a large housing having an opening therein, shearing means and welding means mounted in said opening, said shearing means and said welding means being operative to shear and join said workpieces, respectively, said shearing means comprising a pair of shear carriers disposed on opposite sides of the normal path of workpiece travel, shear blades mounted from said shear carriers, means to effect relative movement of said shear carriers to shear said workpieces; and the improvement comprising means to guide said shear carriers during relative movement thereof independently of said housing.

16. Apparatus according to claim 15 further characterized in that guiding means comprises a pair of guide pins mounted on said shear carriers outwardly of said shear blades, a pair of guide sockets mounted on said shear carriers outwardly of said shear blades, and said guide sockets receiving said guide pins upon relative movement of said shear carriers.

17. In a welder for joining workpieces comprising a large housing having an opening therein, shearing means and welding means mounted in said opening, said shearing means and said welding means being operative to shear and join said workpieces, respectively, said shearing means comprising a pair of shear carriers disposed on opposite sides of the normal path of workpiece travel, said shear carriers being mounted from a pair of supporting surfaces, shear blades carried by said shear carriers, means to effect relative movement of said supporting surfaces to shear said workpieces; the improvement comprising locating means carried by at least one of said supporting surfaces and the shear carrier associated therewith for properly locating said shear carrier with respect to said supporting surface.

18. Apparatus according to claim 17 further characterized in that said locating means comprises cooperating notches and locating blocks.

19. In a welder adapted for joining workpieces comprising a pair of spaced clamping assemblies mounted in the path of workpiece travel, a carriage mounted for transverse movement between said spaced clamping assemblies, said carriage defining a large rectangular opening, shearing apparatus and welding means mounted within said opening in side-by-side relation, said shearing apparatus being positioned outwardly of said clamping assemblies when said welding means is therebetween whereby said shearing apparatus is completely exposed, said shearing apparatus comprising separable opposed shear carriers mounting shear blades; the improvement comprising means to guide said shear carriers during relative movement thereof independently of said housing, and said means to guide forming a die set shear assembly which may be removed as a single unit through said opening when said shearing apparatus is positioned outwardly of said clamping assemblies.

20. Apparatus according to claim 19 further characterized in that at least one of said shear carriers is mounted on a supporting surface, and said shear carrier and said supporting surface having cooperating notches and locating blocks thereon to properly locate said shear carriers during replacement thereof.

21. In a welder for joining workpieces comprising a large housing having an opening therein, means to move said housing transversely of a normal path of workpiece travel, shearing means and welding means mounted in said opening in transversely aligned side-by-side relation, said shearing means and said welding means being operative to shear and join said workpieces, respectively, said shearing means comprising a pair of transversely extending shear carriers disposed on opposite sides of said normal path of workpiece travel, transversely extending shear blades mounted from said shear carriers, means to effect relative movement of said shear carriers to shear said workpieces; the improvement comprising a pair of transversely spaced guiding means, said pair of guiding means being mounted at the opposite ends of said shear carriers adjacent to but transversely outward of said shear blades, said guiding means guiding said shear carriers during relative movement thereof independently of said housing, and the one of said pair of guiding means positioned adjacent said welding means being operative when said shear carriers are retracted to allow transverse movement of said housing to move said shearing means out of and said welding means into said normal path of workpiece travel.

22. Apparatus according to claim 21 further characterized in that each of said guiding means comprises a guide pin mounted on one of said shear carriers, a guide socket mounted on the other of said shear carriers adapted to receive said guide pin upon relative movement of said shear carriers, and the guide pin of said one of said pair of guiding means being shorter than the other guide pin to allow said transverse movement.

References Cited in the file of this patent

UNITED STATES PATENTS

| | | |
|---|---|---|
| 2,023,085 | Lavallee | Dec. 3, 1935 |
| 2,362,388 | MacChesney et al. | Nov. 7, 1944 |
| 2,412,648 | Rendel | Dec. 17, 1946 |
| 2,649,528 | Koenig et al. | Aug. 18, 1953 |